(12) United States Patent
Dahlberg et al.

(10) Patent No.: US 11,000,792 B2
(45) Date of Patent: May 11, 2021

(54) GAS FILTERING DEVICE

(71) Applicants: Leif Dahlberg, Montreal (CA); Patrick Lemire, Mascouche (CA)

(72) Inventors: Leif Dahlberg, Montreal (CA); Patrick Lemire, Mascouche (CA)

(*) Notice: Subject to any disclaimer, the term of this patent is extended or adjusted under 35 U.S.C. 154(b) by 156 days.

(21) Appl. No.: 16/319,401

(22) PCT Filed: Aug. 14, 2018

(86) PCT No.: PCT/CA2018/050985
§ 371 (c)(1),
(2) Date: Jan. 21, 2019

(87) PCT Pub. No.: WO2019/033209
PCT Pub. Date: Feb. 21, 2019

(65) Prior Publication Data
US 2020/0188828 A1 Jun. 18, 2020

(51) Int. Cl.
*B01D 45/00* (2006.01)
*B01D 46/00* (2006.01)
*B01D 46/54* (2006.01)
*B01D 53/04* (2006.01)
*G11B 33/14* (2006.01)
*B01D 19/00* (2006.01)
*B01D 53/22* (2006.01)

(52) U.S. Cl.
CPC ....... *B01D 46/0008* (2013.01); *B01D 46/543* (2013.01); *B01D 19/0031* (2013.01); *B01D 53/0415* (2013.01); *B01D 53/228* (2013.01); *B01D 2251/60* (2013.01); *B01D 2253/102* (2013.01); *B01D 2253/106* (2013.01); *B01D 2257/90* (2013.01); *G11B 33/1486* (2013.01); *Y10T 29/49826* (2015.01)

(58) Field of Classification Search
CPC .............. B01D 46/0008; B01D 46/543; B01D 2253/102; B01D 2257/90; B01D 53/0415; B01D 2253/106; B01D 2251/60; B01D 19/0031; B01D 53/228; G11B 33/1486; Y10T 29/49826
See application file for complete search history.

(56) References Cited

U.S. PATENT DOCUMENTS

2004/0168575 A1* 9/2004 Isogawa ................ B01D 46/12
96/134
2006/0032372 A1* 2/2006 Dauber .............. B01D 46/0032
95/90

(Continued)

FOREIGN PATENT DOCUMENTS

WO   WO-2018014250 A1 * 1/2018 ............. B01D 53/02

*Primary Examiner* — Dung H Bui (57) ABSTRACT

The present disclosure relates to a gas filtering device that allows to cover and filter gases emanating from liquid and/or solid substances without the use of auxiliary technologies. The gas filtering device comprises an air tight geomembrane that is adapted to cover and seal the surface from which the gas emanations come from, one or more air permeable filtering cartridge pocket(s) embedded within the air tight geomembrane that are adapted to adopt an opened configuration and a closed configuration, and one or more corresponding filtering cartridge(s) that are releasably secured within the air permeable filtering cartridge pocket.

20 Claims, 6 Drawing Sheets

(56) References Cited

U.S. PATENT DOCUMENTS

| | | | | |
|---|---|---|---|---|
| 2006/0191249 | A1* | 8/2006 | Gogins | B01D 46/10 |
| | | | | 55/528 |
| 2008/0257151 | A1* | 10/2008 | Mayer | B01D 53/261 |
| | | | | 95/90 |
| 2012/0060693 | A1* | 3/2012 | Sasaki | F24F 13/085 |
| | | | | 96/139 |
| 2015/0000521 | A1* | 1/2015 | Heap | B01D 19/0031 |
| | | | | 95/46 |
| 2017/0236556 | A1* | 8/2017 | Kato | G11B 33/146 |
| | | | | 360/97.17 |
| 2017/0333820 | A1* | 11/2017 | Tuma | G11B 33/1446 |
| 2018/0320380 | A1* | 11/2018 | Crowther | E02D 31/008 |
| 2019/0085522 | A1* | 3/2019 | Scuero | E02B 7/08 |

* cited by examiner

GAS FILTERING DEVICE

CROSS-REFERENCE TO RELATED APPLICATIONS

This application claims priority from U.S. Provisional Application No. 62/605,417 filed on Aug. 14, 2017.

TECHNICAL FIELD

The present disclosure relates to gas filtering devices. More particularly, the present disclosure relates to gas filtering devices that are adapted to cover and filter gases emanating from liquid and/or solid substances without the use of auxiliary technologies.

BACKGROUND

Foul odors provided by gaseous emanations are an unfortunate reality at wastewater treatment plants or at any other similar plants. If left uncontrolled, nuisance odors can waft into public spaces and residential/commercial/industrial areas located around the plant.

There already exists on the market a plurality of solutions to better control such gas emanation. Some of them involve covering the liquid and/or solid surfaces using geo-textile membranes, aluminum, steel, concrete or other type of panels. These methods are not only expensive but require extra equipment to treat the odorous air molecules that remain trapped underneath these covers. Indeed, powerful fans, for example, need to draw the odorous air molecules through activated carbon filters and further away from the cover. Biofilters are also sometimes used instead of activated carbon filters, but such systems that include biofilters still require expensive fans, a lot of energy and maintenance time to deal with gas emissions.

Some other solutions do not cover the liquid or solid surface using a covering device but rather involve spraying chemicals in the atmosphere above the surface, the water surface for example, in an attempt to neutralize the emanating odors. This approach requires continuous use of chemicals and constant maintenance of the dispersing/dispensing system, resulting in important costs.

There is therefore a need for an improved gas filtering device that is adapted to cover and filter gases emanating from liquid and/or solid substances without the use of auxiliary technologies (fans, chemicals and the like).

SUMMARY

It is an object of the present disclosure to provide a gas filtering device that overcomes or mitigates one or more disadvantages of known gas filtering devices or at least provides a useful alternative.

According to an embodiment, there is provided a gas filtering device for covering a surface from which gases are emanating, the gas filtering device comprising: an air tight geomembrane adapted to cover and seal the surface; an air permeable filtering cartridge pocket embedded within the air tight geomembrane adapted to adopt an opened configuration and a closed configuration; and a filtering cartridge releasably secured within the air permeable filtering cartridge pocket.

According to another embodiment, there is provided the gas filtering device as defined above, wherein the air permeable filtering cartridge pocket comprises a plurality of spaced apart air permeable filtering cartridge pockets embedded within the air tight geomembrane, and further wherein the filtering cartridge comprises a plurality of filtering cartridges, each one of the plurality of filtering cartridges being releasably secured within a corresponding one of the plurality of spaced apart air permeable filtering cartridge pockets.

According to a further embodiment, there is provided the gas filtering device as defined above, wherein each one of the spaced apart air permeable filtering cartridge pockets comprises: an air permeable pocket first sheet defining a first sheet first surface and a first sheet second surface opposite the first sheet first surface; and an air permeable pocket second sheet defining a second sheet first surface and a second sheet second surface opposite the second sheet first surface, at least part of the second sheet first surface releasably engaging with at least part of the first sheet second surface to allow the air permeable filtering cartridge pocket to adopt the opened and closed configurations.

According to yet another embodiment, there is provided the gas filtering device as defined above, wherein: the first sheet second surface defines a first peripheral edge; and the second sheet first surface defines a second peripheral edge corresponding to the first peripheral edge, at least part of the second peripheral edge releasably engaging with at least part of the first peripheral edge to allow the air permeable filtering cartridge pocket to adopt the opened and closed configurations.

According to another embodiment, there is provided the gas filtering device as defined above, further comprising: a fastening member on at least part of the first peripheral edge; and a corresponding fastening member on at least part of the second peripheral edge to releasably connect with the fastening member.

According to a further embodiment, there is provided the gas filtering device as defined above, wherein the fastening member and the corresponding fastening member comprise hook and loop fasteners.

According to yet another embodiment, there is provided the gas filtering device as defined above, wherein the air permeable pocket second sheet further comprises a connecting member for providing the air permeable filtering cartridge pocket in its opened configuration.

According to another embodiment, there is provided the gas filtering device as defined above, wherein: the air permeable pocket first sheet comprises a first set of apertures; and the air permeable pocket second sheet comprises a second set of apertures; the first and second set of apertures allowing gases that are emanating from the surface to be filtered while travelling towards and further away from the filtering cartridge releasably secured within the air permeable filtering cartridge pocket.

According to a further embodiment, there is provided the gas filtering device as defined above, wherein the air tight geomembrane comprises polyester.

According to yet another embodiment, there is provided the gas filtering device as defined above, wherein the air permeable pocket first sheet comprises a reinforcement member.

According to another embodiment, there is provided the gas filtering device as defined above, wherein the gases are emanating from an opened-air tank defining a tank peripheral edge and tank walls, the gas filtering device further comprising: a first securing elongated member fixedly mounted about the tank peripheral edge; and a second securing elongated member fixedly mounted on the first securing elongated member, the first and second securing elongated member together securing the air tight geomembrane therebetween.

According to a further embodiment, there is provided the gas filtering device as defined above, wherein: the first securing elongated member defining spaced apart holes; and the second securing elongated member defining corresponding spaced apart holes; the gas filtering device further comprising: spaced apart anchors positioned about the tank peripheral edge for receiving the first and second securing elongated members via their spaced apart holes and the corresponding spaced apart holes.

According to yet another embodiment, there is provided the gas filtering device as defined above, further comprising a supporting device secured to the opened-air tank for supporting the air tight geomembrane.

According to another embodiment, there is provided the gas filtering device as defined above, wherein the supporting device comprises: spaced apart elongated cable sections each defining a first cable section end and a second cable section end, the first cable section end being secured to one of the tank walls, the second cable section end being secured to another one of the tank walls opposite the one of the tank walls.

According to a further embodiment, there is provided the gas filtering device as defined above, wherein the supporting device comprises: a first set of spaced apart elongated cables; and a second set of spaced apart elongated cables positioned perpendicularly to the first set of spaced apart elongated cables, each elongated cable from the first and second sets of spaced apart elongated cables defining a first cable end and a second cable end, the first cable end being secured to one of the tank walls, the second cable end being secured to another one of the tank walls opposite the one of the tank walls.

According to yet another embodiment, there is provided the gas filtering device as defined above, wherein each elongated cable from the first and second sets of spaced apart cables comprises a first cable anchor about the first cable end and a second cable anchor about the second cable end, the first cable anchor being secured to one of the tank walls, the second cable anchor being secured to another one of the tank walls opposite the one of the tank walls.

According to another embodiment, there is provided the gas filtering device as defined above, wherein the filtering cartridge is an activated carbon filter.

According to a further embodiment, there is provided the gas filtering device as defined above, wherein the filtering cartridge comprises at least one of: an activated carbon filter, a photo-catalytic membrane, an organic compound and a gas-and-odor filtering media.

According to yet another embodiment, there is provided the gas filtering device as defined above, wherein part of the second peripheral edge is fused with part of the first peripheral edge to allow the air permeable filtering cartridge pocket to adopt the opened and closed configurations.

According to another embodiment, there is provided the gas filtering device as defined above, wherein the air tight geomembrane further comprises drains.

According to a further embodiment, there is provided the gas filtering device as defined above, wherein the gases are emanating from an opened-air tank defining a tank peripheral edge and tank walls, the gas filtering device further comprising: a securing elongated member fixedly mounted on the tank peripheral edge, the securing elongated member together with the tank peripheral edge securing the air tight geomembrane therebetween.

According to yet another embodiment, there is provided the gas filtering device as defined above, wherein: the securing elongated member defining spaced apart holes; the gas filtering device further comprising: spaced apart anchors positioned about the tank peripheral edge for receiving the second securing elongated member via its spaced apart holes.

According to another embodiment, there is provided the gas filtering device as defined above, further comprising at least one of: an access port and a window embedded within the air tight geomembrane, each one of the access port and the window configured to adopt an opened configuration and a closed configuration.

BRIEF DESCRIPTION OF THE DRAWINGS

Further features and advantages of the present disclosure will become apparent from the following detailed description, taken in combination with the appended drawings, in which.

DETAILED DESCRIPTION

Gas filtering devices described below allow to cover and filter gases emanating from liquid and/or solid substances without the use of auxiliary technologies. The described device is a bespoke reinforced geomembrane that includes activated carbon filters (or other suitable filters), to cover tightly, and reduce emissions in, liquid tanks. The design may be adjusted depending on the type of tank that needs to be covered (size, process and type of gas emission).

Figure 1:
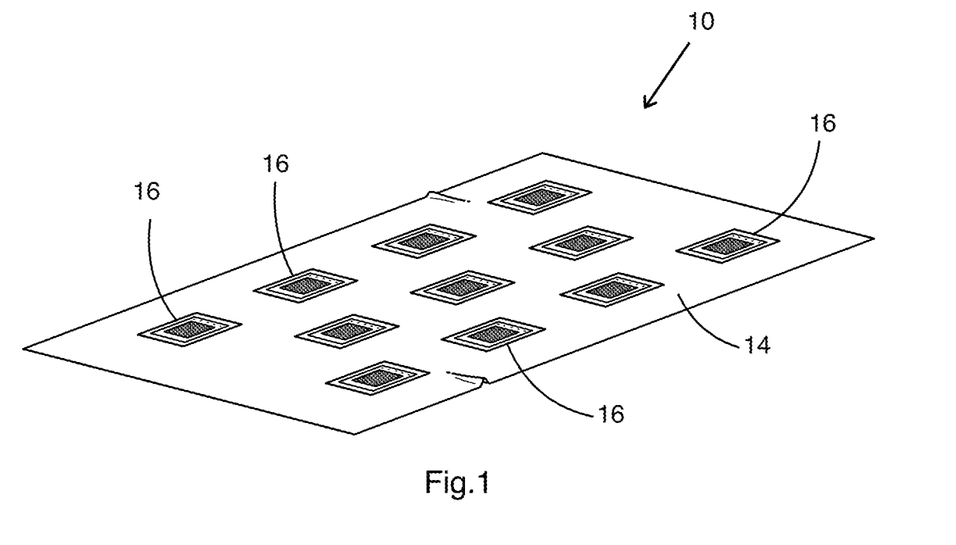
FIG. 1 is a top perspective view of a gas filtering device in accordance with an embodiment.
Figure 2:
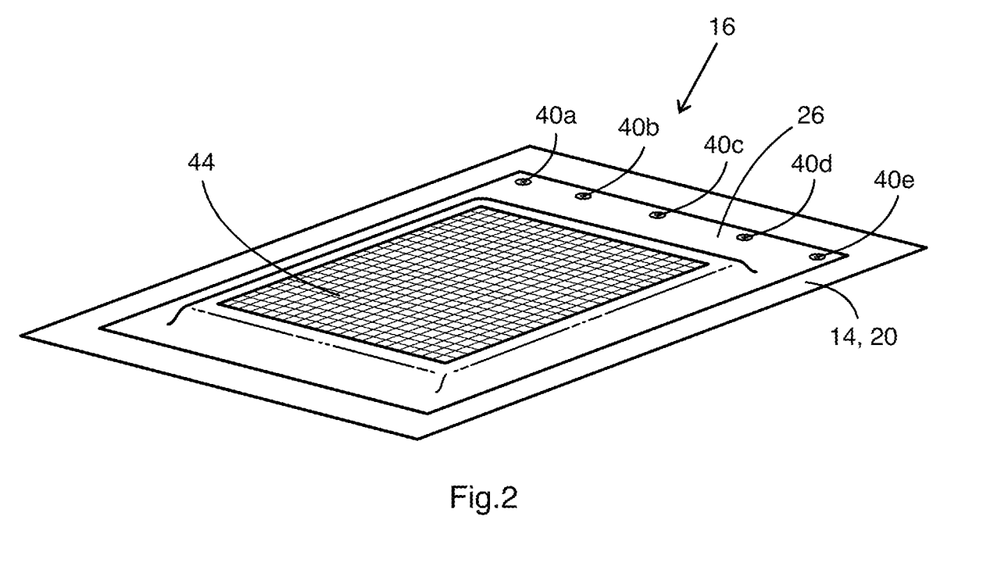
FIG. 2 is a closed-up view of one of the air permeable filtering cartridge pockets shown in FIG. 1, where the air permeable filtering cartridge pocket is shown in its closed configuration.
Figure 3:
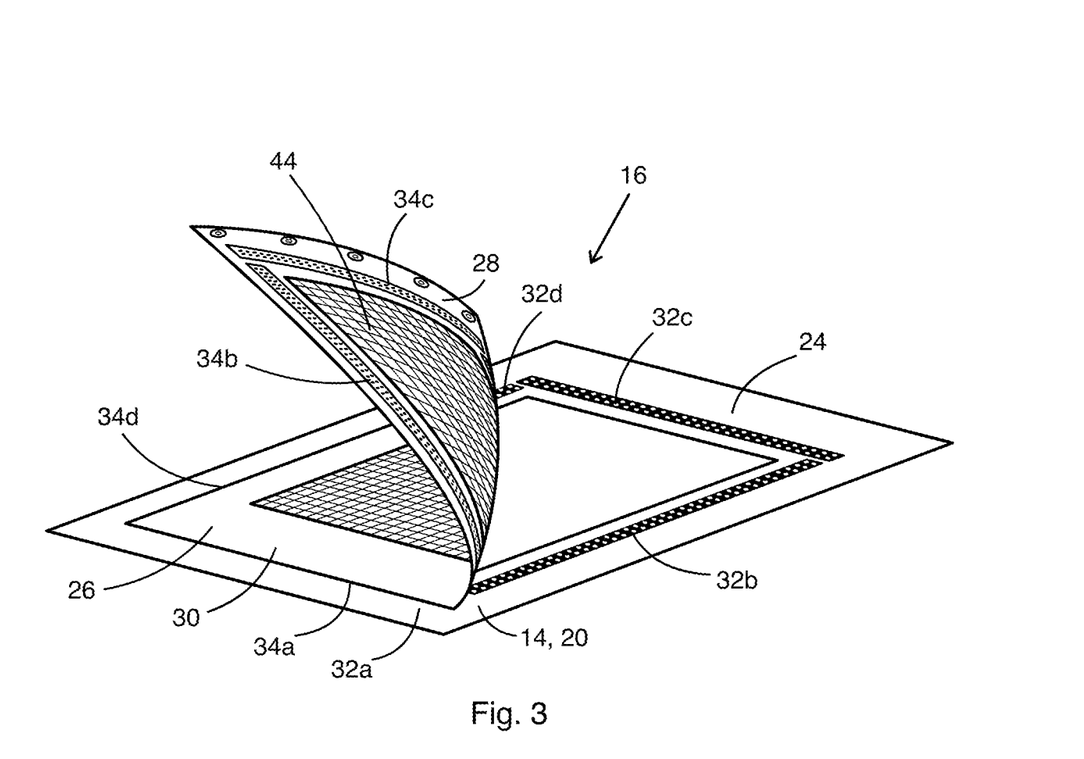
FIG. 3 is a closed-up view of one of the air permeable filtering cartridge pockets shown in FIG. 1, where the air permeable filtering cartridge pocket is shown in its opened configuration.

Referring now to the drawings and more particularly to FIGS. 1 to 4, there is shown a gas filtering device 10 that is configured to cover a surface 112 (FIG. 5) from which gases are emanating. Gas filtering device 10 comprises an air tight geomembrane 14 which is adapted to cover surface 112. Air tight geomembrane 14 defines a geomembrane first surface 13 and a geomembrane second surface 15, which is found opposite geomembrane first surface 13. Gas filtering device 10 further comprises spaced apart air permeable filtering cartridge pockets 16 that are embedded within air tight geomembrane 14. Each one of the air permeable filtering cartridge pockets 16 is adapted to adopt a closed configuration (FIGS. 1, 2 and 4) and an opened configuration (FIG. 3). Gas filtering device 10 further comprises filtering cartridges 18 that are releasably secured within each one of the spaced apart air permeable filtering cartridge pockets 16. It is to be noted that shape and size of air tight geomembrane 14 is determined by the surface that needs to be covered. Furthermore, it is also to be noted that the number and locations of air permeable filtering cartridge pockets 16 (and their corresponding filtering cartridge 18) are to be customized depending on the type of surface to be treated and the ease of accessibility for maintenance. Each air permeable filtering cartridge pocket 16 may be designed to accommodate various sizes, thicknesses, configurations and/or shapes of filtering cartridges.

Still referring to FIGS. 1 to 4, there is shown that each one of the spaced apart air permeable filtering cartridge pockets 16 includes an air permeable pocket first sheet or membrane 20, which defines a first sheet first surface 22 and a first sheet second surface 24, found opposite first sheet first surface 22, as well as an air permeable pocket second sheet or membrane 26, which defines a second sheet first surface 28 and a second sheet second surface 30, found opposite second sheet first surface 28. It is to be noted that each air permeable filtering cartridge pocket 16 is composed of geomembrane 14, the air permeable pocket first sheet 20 here being presented as geomembrane 14. Other configurations are however possible, as long as it provides gas filtering device 10 with one or more air permeable filtering cartridge pocket(s) to receive one or more filtering cartridge(s).

First sheet second surface 24 defines first peripheral edges 32a, 32b, 32c, 32d, while second sheet first surface 28 defines second peripheral edges 34a, 34b, 34c, 34d corresponding to first peripheral edges 32a, 32b, 32c, 32d. As better shown in FIGS. 3 and 4, second peripheral edges 34b, 34c, 34d are configured to releasably engage with corresponding first peripheral edges 32b, 32c, 32d to allow air permeable filtering cartridge pocket 16 to adopt the opened (FIG. 3) and closed (FIG. 4) configurations. On the other hand, first peripheral edge 32a is fused to corresponding second peripheral edge 34a, so that air permeable pocket second sheet 26 remains secured to air permeable pocket first sheet 20, even when air permeable filtering cartridge pocket 16 is found in its opened configuration. It is however to be noted that a person skilled in the art to which the gas filtering device described above pertains would understand that air permeable filtering cartridge pocket 16 may take any shape, size and/or configuration, as long as it allows filtering cartridge 18 to be releasably secured therein. Therefore, one or more peripheral edges (first and second peripheral edges) may be configured to releasably connect with its corresponding peripheral edge. Permeable pocket second sheet 26 may therefore be completely disconnected from permeable pocket first sheet 20 (when air permeable filtering cartridge pocket 16 is provided in its opened configuration), as long as it can be connected again to permeable pocket second sheet 26.

Figure 4:
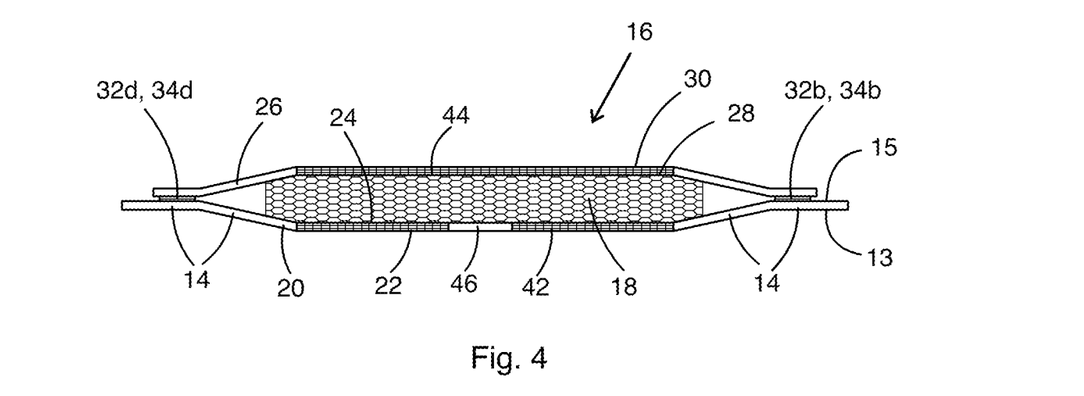
FIG. 4 is a cross-sectional view of one of the air permeable filtering cartridge pockets shown in FIG. 1, where the air permeable filtering cartridge pocket is shown in its closed configuration, releasably securing a filtering cartridge therein.

Still referring to FIGS. 3 and 4, there is shown that a fastening member is found on first peripheral edges 32b, 32c, 32d, while a corresponding fastening member is found on second peripheral edges 34b, 34c, 34d to releasably connect with the fastening member found on first peripheral edges 32b, 32c, 32d. The fastening member found on first peripheral edges 32b, 32c, 32d and the corresponding fastening member found on second peripheral edges 34b, 34c, 34d may comprise hook and loop fasteners. A person skilled in the art to which the gas filtering device 10 described above pertains would however understand that any other suitable fastening devices may be used (magnetized elements, sticky elements, and the like), as long as it provides air permeable filtering cartridge pocket 16 to adopt its opened and closed configurations so that filtering cartridge 18 may be introduced within and removed from air permeable filtering cartridge pocket 16 easily.

As best shown in FIGS. 2 and 3, air permeable pocket second sheet 26 of gas filtering device 10 further comprises a plurality of connecting members 40a, 40b, 40c, 40d, 40e that are configured to easily provide air permeable filtering cartridge pocket 16 in its opened configuration. For example, a rope or any other device may be attached to one or more of the connecting members 40a, 40b, 40c, 40d, 40e to open the flap, namely the air permeable pocket second sheet 26 from a distance. However, a person skilled in the art to which gas filtering device 10 described above pertains would understand that air permeable pocket second sheet 26 may include one or more connecting member(s) that can be configured according to different shapes, sizes and designs, as long as it provides one to easily disconnect one or more peripheral edges from its corresponding peripheral edges.

Still referring to FIGS. 2 and 3, there is shown that air permeable pocket first sheet 20 comprises a plurality of apertures 42 (mesh sheet for example), while air permeable pocket second sheet 26 comprises a plurality of apertures 44 (mesh sheet for example), allowing air to travel within filtering cartridge 18. Accordingly, when filtering cartridge 18 is secured within air permeable filtering cartridge pocket 16, apertures 42, 44 found in air permeable pocket first and second sheets 20, 26 allow gases that are emanating from surface 112 to be filtered by filtering cartridge 18 while travelling towards and further away from filtering cartridge 18 (flow of air is allowed within air permeable filtering cartridge pocket 16).

Air tight geomembrane 14 may be made of polyester or coated polyester (or from any composition that comprises polyester). A person skilled in the art to which gas filtering device 10 described above pertains would however understand that air tight geomembrane 14 may be made of any material that is chemically resistant and further sufficiently strong and resistant.

As best shown in FIG. 4, air permeable pocket first sheet 20 (geomembrane 14 with apertures 42) of air permeable filtering cartridge pocket 16 comprises a reinforcement member 46 to help securing/holding filtering cartridge 18 in place.

Filtering cartridge 18 is preferably an activated carbon filter, however, a person skilled in the art to which gas filtering device 10 as described above pertains would understand that filtering cartridge 18 may include, without limitation, an activated carbon filter, a photo-catalytic membrane, an organic compound, a gas-and-odor filtering media, any combination thereof, and the like. The filtering element is intended to absorb and/or degrade gases that are emanating from the surface (from solid and/or liquid substances). The filtering cartridges 18 are porous and allow for oxygen exchange while capturing the odorous gases that rise upwards under the gas filtering device or cover 10.

It is to be mentioned that air tight geomembrane 14 of gas filtering device 10 as described above may further include additional drains, even if air permeable filtering cartridge pockets 16 (together with filtering cartridge 18) further take such role, together with their air filtering functionality. Indeed, air permeable filtering cartridge pockets 16 together with filtering cartridge 18 also function as drains of rain water. Gas filtering device 10 will therefore be able to withstand the weight of large amounts of water.

Figure 5:
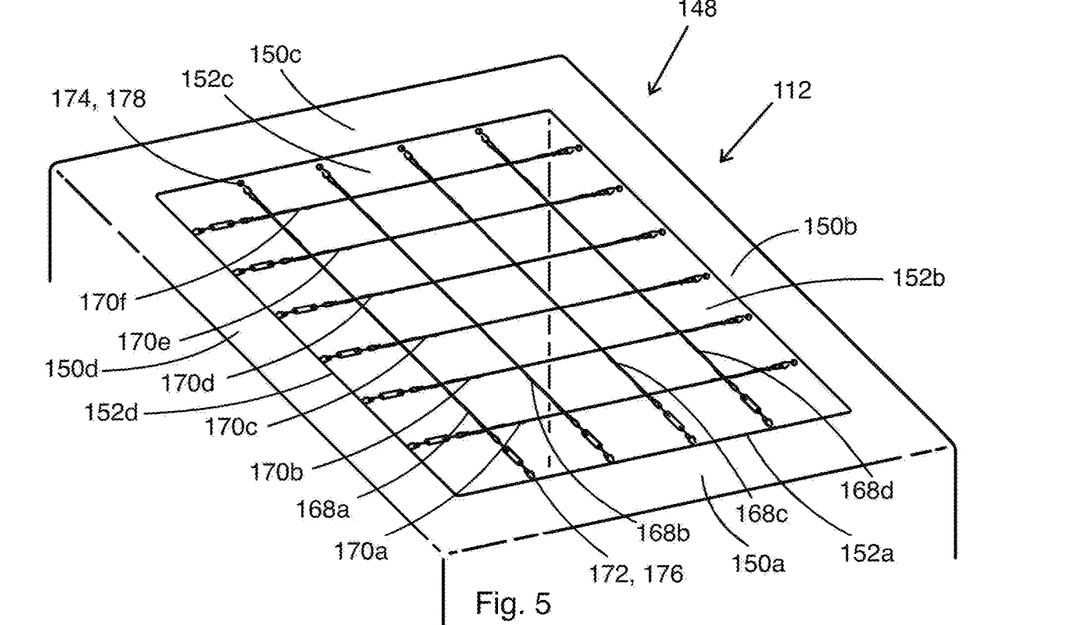
FIG. 5 is a top perspective view of an opened-air tank that is configured to receive a gas filtering device.
Figure 6:
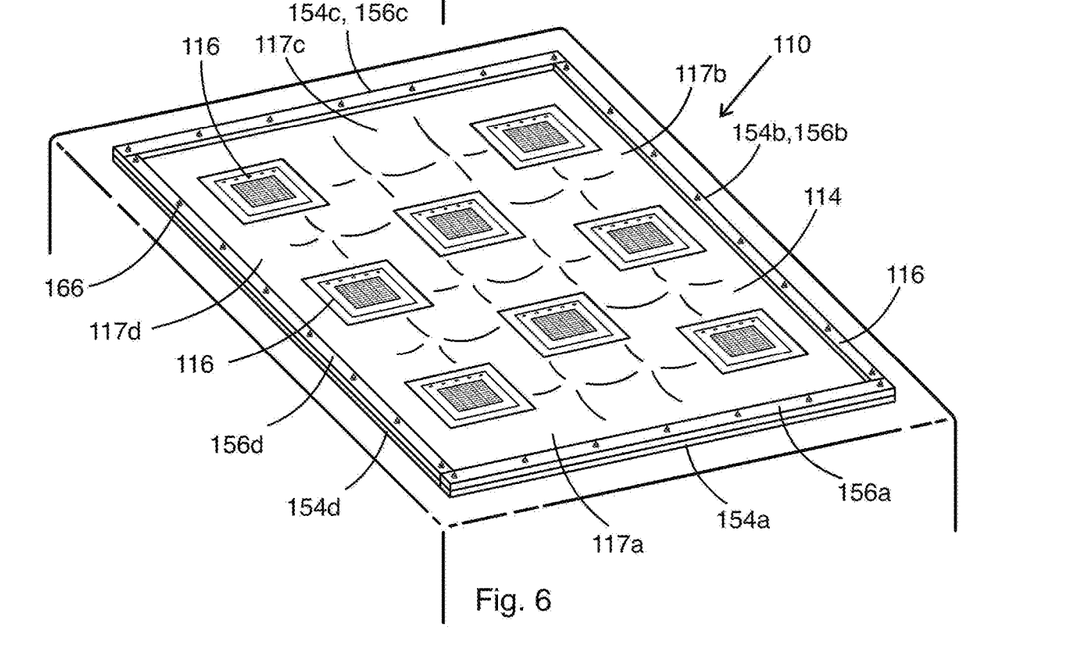
FIG. 6 is a top perspective view of the opened-air tank shown in FIG. 5 that is covered by a gas filtering device in accordance with another embodiment.
Figure 7:
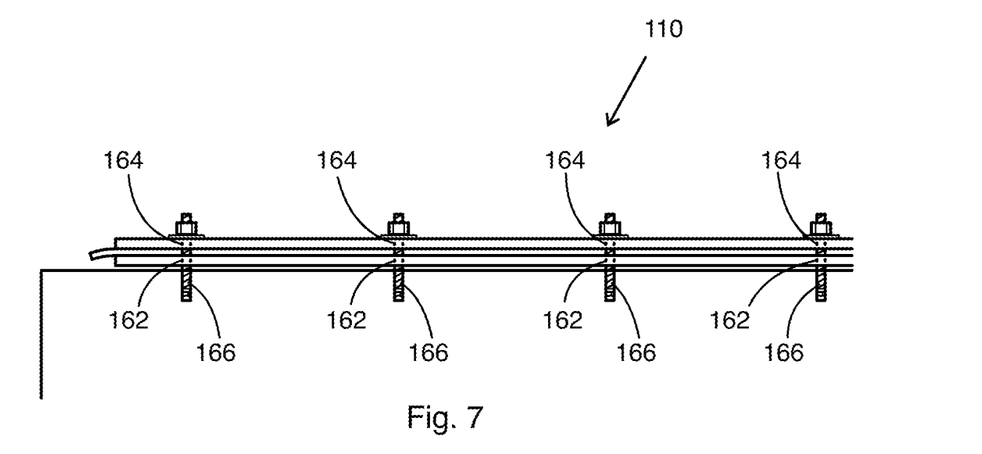
FIG. 7 is a side elevation view of the air tight geomembrane that is secured in-between first and second securing elongated members (or batten bars) and to spaced apart anchors.

Referring now more particularly to FIGS. 5, 6 and 7, there is shown a gas filtering device 110 in accordance with another embodiment, that is configured to filter and cover gases that are emanating from an opened-air tank 148. Opened-air tank 148 defines tank peripheral edges 150a, 150b, 150c, 150d, as well as tank walls 152a, 152b, 152c, 152d. The fixing of geomembrane 114 on the edges of the tank 150a, 150b, 150c, 150d is here done using batten bars (or angle bars depending on the shape of the tank itself) which are an integral part of device 110 (for example, batten bars may be made of aluminum or of any other suitable material). Hardware of adequate size may also be required for cross support according to the individual strength/load requirements, as it will be described in more details below (for example, hardware of adequate size may be made of stainless steel or of any other suitable material such as, without limitation, steel, galvanized steel and the like).

Gas filtering device 110, as described above, is configured to cover surface 112 (FIG. 5) from which gases are emanating. Gas filtering device 110 also comprises an air tight geomembrane 114 which is adapted to cover surface 112. Air tight geomembrane 114 further defines geomembrane side edges 117a, 117b, 117c, 117d. Gas filtering device 110 further comprises spaced apart air permeable filtering cartridge pockets 116 that are embedded within air tight geomembrane 114. Each one of the air permeable filtering cartridge pockets 116 is adapted to adopt a closed configuration (FIG. 6) and an opened configuration. Gas filtering device 110 further comprises filtering cartridges (not shown) that are releasably secured within each one of the spaced apart air permeable filtering cartridge pockets 116.

As best shown in FIG. 5, gas filtering device 110 further comprises a supporting device that is fixedly secured to tank walls 152a, 152b, 152c, 152d of opened-air tank 148 and further adapted to help supporting air tight geomembrane 114. Indeed, the supporting device shown in FIG. 5 includes a first set of spaced apart elongated cables 168a, 168b, 168c, 168d and a second set of spaced apart elongated cables 170a, 170b, 170c, 170d, 170e, 170f that is positioned perpendicularly to first set of spaced apart elongated cables 168a, 168b, 168c, 168d. Each elongated cable from first and second sets of spaced apart elongated cables defines a first cable end 172 and a second cable end 174. First cable end 172 is being secured to one of the tank walls (152a), while second cable end 174 is being secured to another one of the tank walls (152c), found opposite tank wall 152a. All cable ends are therefore secured to tank walls so that air tight geomembrane 114 may be laid down on first and second set of spaced apart elongated cables. Such as to provide the secured connection between the tank walls (or the tank edges or any other structural elements) and the cables, each elongated cable from the first and second sets of spaced apart cables further comprises a first cable anchor 176 (with turnbuckle) about the first cable end 172 and a second cable anchor 178 (with or without turnbuckle) about the second cable end 174. The first cable anchor 176 is being secured to one of the tank walls (152a), while the second cable anchor 178 is being secured to another one of the tank walls (152c), found opposite tank wall 152a. It is to be mentioned that even if four cables 168a, 168b, 168c, 168d are shown in FIG. 5 in the first direction (longitudinal direction) of tank 148 and six cables 170a, 170b, 170c, 170d, 170e, 170f are shown in the second direction (lateral direction) of tank 148, a person skilled in the art to which the gas filtering device described above pertains would understand that a first cable (one cable only) could be used to position cable sections in the first direction of the tank (representing cable sections 168a, 168b, 168c, 168d) and a second cable (one cable only) could be used to position cable sections in the second direction of the tank (representing cable sections 170a, 170b, 170c, 170d, 170e, 170f). Similarly, one and only one cable may alternatively be used to position cable sections in the first and the second directions of the tank (representing cable sections 168a, 168b, 168c, 168d, 170a, 170b, 170c, 170d, 170e, 170f in FIG. 5), as long as it helps support weight of air tight geomembrane 114. Number and positions of cables and/or cable sections may therefore vary. It is to be mentioned that supporting device may take any other shape, size and/or configuration (posts, supporting beams, balloons, etc.), again, as long as it helps support weight of air tight geomembrane 114.

Referring now to FIGS. 6 and 7, there is shown that gas filtering device 110 further comprises first securing elongated members or bars 154a, 154b, 154c, 154d that are fixedly mounted about tank peripheral edge (on a concrete or metal support or surface) 150a, 150b, 150c, 150d, and second securing elongated members or bars 156a, 156b, 156c, 156d that are fixedly mounted on respective first securing elongated members 154a, 154b, 154c, 154d. First and second securing elongated members 154a, 154b, 154c, 154d, 156a, 156b, 156c, 156d together secure air tight geomembrane 114 therebetween. In order to do so, first securing elongated members 154a, 154b, 154c, 154d defines spaced apart holes or anchor points 162, while second securing elongated members 156a, 156b, 156c, 156d defines corresponding spaced apart holes or anchor points 164. Furthermore, gas filtering device 110 further comprises spaced apart anchors 166 that are fixedly secured/positioned about tank peripheral edges 150a, 150b, 150c, 150d for receiving first and second securing elongated members or bars 154a, 154b, 154c, 154d, 156a, 156b, 156c, 156d via their spaced apart holes 162 and corresponding spaced apart holes 164 (the membrane will be laid between the bars). It is to be mentioned that a person skilled in the art to which the gas filtering device pertains would understand that edges 117a, 117b, 117c, 117d of geomembrane 114 may be connected to, or connected about, edges 150a, 150b, 150c, 150d of opened-air tank 148 using any other structures or elements, as long as it provides necessary sealing at the tank peripheral edges (air flow needs to travel towards the air permeable filtering cartridge pockets and filtering cartridges, not at the geomembrane/opened-air tank periphery).

Indeed, according to another scenario (not shown), gas filtering device 110 may only include second securing elongated members or bars 156a, 156b, 156c, 156d (the upper batten bars shown in FIGS. 6 and 7) that would be fixedly mounted directly on part of geomembrane and tank peripheral edges (on a concrete or metal surface) 150a, 150b, 150c, 150d (without any underneath batten bar). Indeed, on new construction sites for example, or where surface defined by peripheral edges is found to be smooth and even, only second securing elongated members 156a, 156b, 156c, 156d may be used to secure air tight geomembrane 114, as part of air tight geomembrane 114 will be sandwiched between the even/smooth concrete and/or metallic surface and second securing elongated members or batten bars 156a, 156b, 156c, 156d.

Therefore, during installation of gas filtering device 110 (FIGS. 5, 6 and 7), first and second sets of elongated cables 168a, 168b, 168c, 168d, 170a, 170b, 170c, 170d, 170e, 170f are spacedly anchored to tank walls 152a, 152b, 152c, 152d (or other structures) using cable anchors 176, 178. Anchors 166 (FIG. 7) are then spacedly secured about tank peripheral edges 150a, 150b, 150c, 150d. First securing elongated members 154a, 154b, 154c, 154d are inserted over spaced apart anchors 166 by aligning their spaced apart holes 162 with the anchors 166. Geomembrane 114 is then laid down on first and second sets of elongated cables 168a, 168b, 168c, 168d, 170a, 170b, 170c, 170d, 170e, 170f and geomembrane side edges 117a, 117b, 117c, 117d are perforated and secured by (placed over) the anchors 166. Second securing elongated members 156a, 156b, 156c, 156d are inserted over first securing elongated members 154a, 154b, 154c, 154d by aligning their corresponding spaced apart holes 164 with anchors 166. Geomembrane 114 is (or geomembrane side edges 117a, 117b, 117c, 117d are) then secured in-between the bars (in-between first securing elongated members 154a, 154b, 154c, 154d and second securing elongated members 156a, 156b, 156c, 156d) and anchors 166 (nuts and bolts) act such as to sandwich geomembrane 14 between the bars 154a, 154b, 154c, 154d and 156a, 156b, 156c, 156d. Such configuration creates a tight air seal so that gas cannot emanate from tank peripheral edges 150a, 150b, 150c, 150d at geomembrane side edges 117a, 117b, 117c, 117, but only from air permeable filtering cartridge pockets 116 (and corresponding filtering cartridge).

Accordingly, for example, a first part of the installation may consist in placing support cables across the tank. A good practice would be to alternate the cables under and on top of each other for maximum stability. The second part of the installation may consist of installing and sealing the geomembrane containing the filtering cartridge on the edges of the basin/tank. This may be done by securing the batten bars (or angle bars depending on the shape of the tank itself) with wedge anchors (holes are provided in the concrete to receive the anchors). The geomembrane may then be laid across the basin over the support cables. Once the geomembrane is properly aligned on all side edges of the basin with some material going over the batten bars, the extra material may be folded underneath the top of the membrane and holes may be punched through both layers of the geomembrane at the exact location where the wedge anchors are. Finally, the second batten bar may be lowered over the wedge anchors and secured in place with nuts (the membrane will then be laid/sandwiched between the bars). The purpose of the batten bars is mainly to seal the tarp and prevent the gases escaping by the geomembrane side edges, not to hold the weight of the geomembrane itself.

The gas filtering devices described above may be provided for covering numerous types of surface areas, such as, without limitation, aerated basins, non-aerated basins, lagoons, anaerobic lagoons, opened-air tanks, activated sludge, tailing ponds, aeration ponds, clarifiers, land-fills, ventilation exit points, any combination, and the like, according to a plurality of different industrial markets, such as, without limitation, mining, oil sands, municipal and industrial waste water treatment, agro-food, composting, landfills, and the like.

Figure 8:
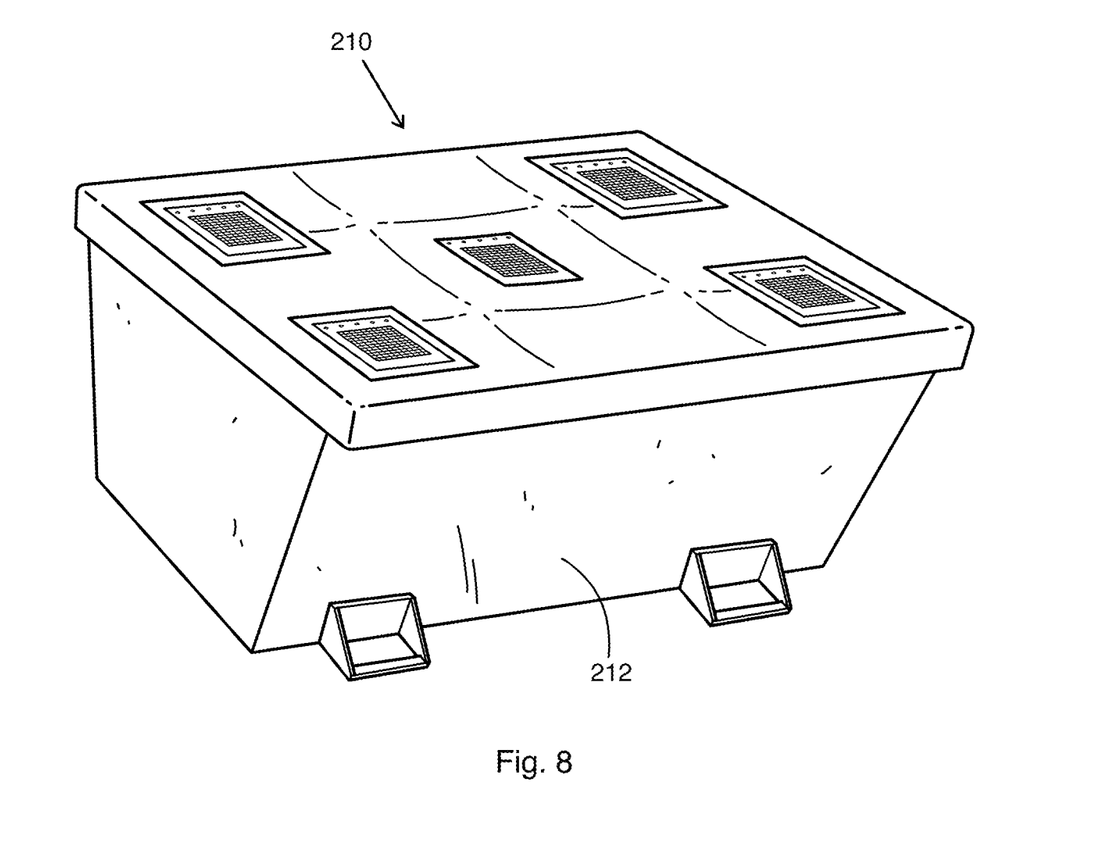
FIG. 8 is a top perspective view of a gas filtering device covering a trash bin in accordance with a further embodiment.

Indeed, FIG. 8 shows a gas filtering device 210 in accordance with a further embodiment, that is adapted to cover a trash (sludge, garbage, refuse, etc.) bin 212. In this scenario, geomembrane needs mainly to be sealed to the trash (sludge, garbage, refuse, etc.) bin such as to prevent the gases escaping by the geomembrane side edges.

Figure 9:
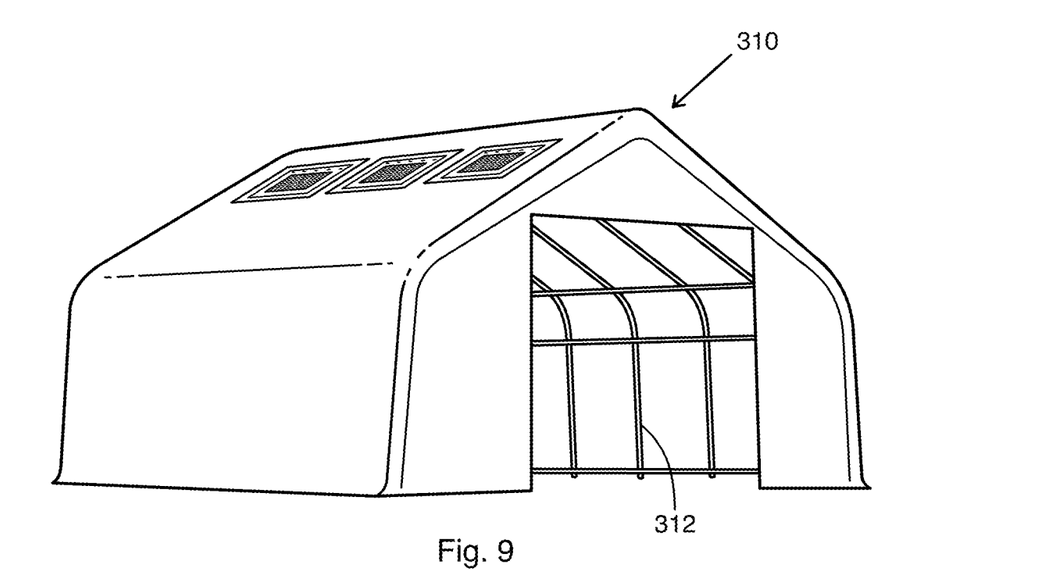
FIG. 9 is a top perspective view of a gas filtering device in accordance with yet another embodiment.

FIG. 9 shows a gas filtering device 310 in accordance with yet another embodiment that is configured to be supported by frame 312. Gas filtering device 310, together with frame 312, may be installed, for example, on the bin of a garbage truck. In this scenario, geomembrane will further need to be sealed to the truck bin such as to prevent the gases escaping by the geomembrane side edges.

Figure 10:
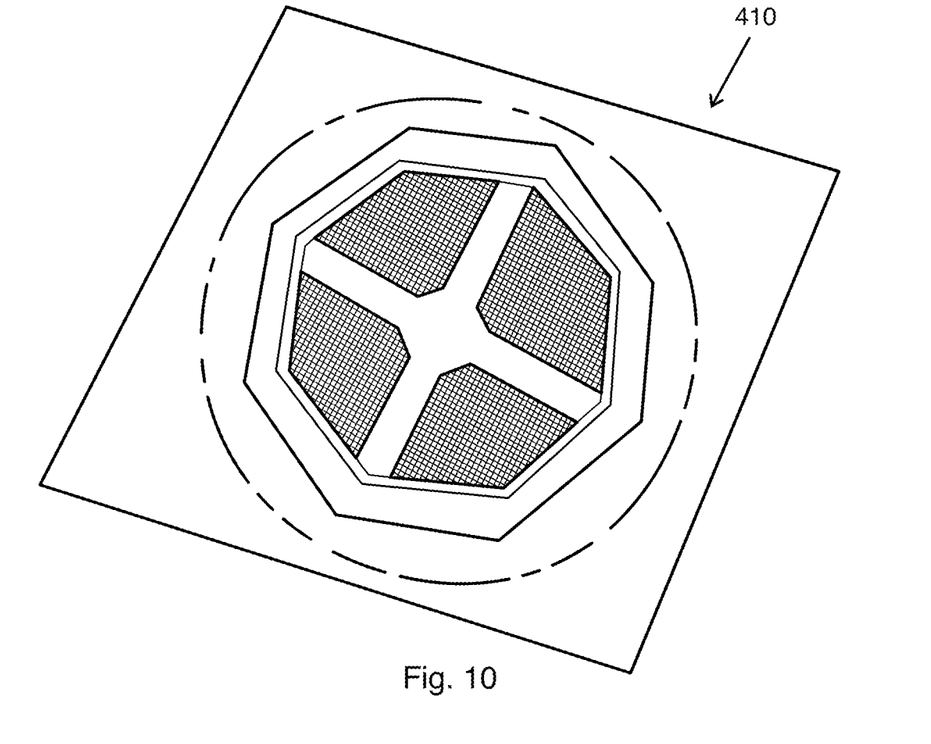
FIG. 10 is a top perspective view of a gas filtering device in accordance with another embodiment, that is adapted to cover a sewer drain.

FIG. 10 illustrates a gas filtering device 410 in accordance with another embodiment, that is adapted to cover a sewer drain. Indeed, gas filtering device 410 may be positioned above a sewer drain (not shown) and retained by weight of the lid. Geomembrane that exceeds periphery of the sewer drain lid may further be removed. Gas filtering device may further be supported by the sewer drain lid at its center using a securing element that extends from the geomembrane (not shown).

Figure 11:
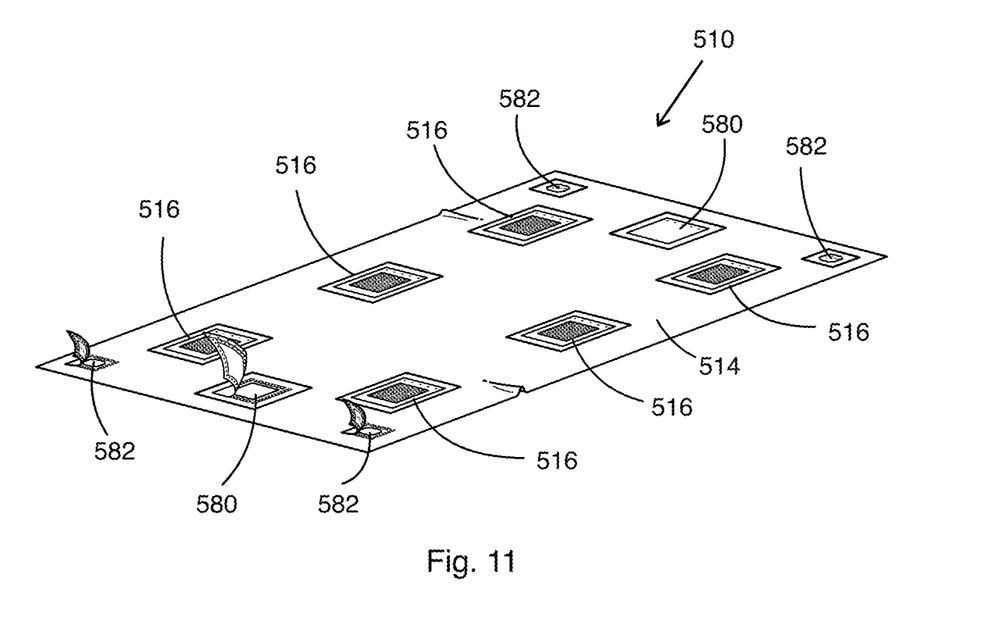
FIG. 11 is a top perspective view of a gas filtering device in accordance with a further embodiment.

FIG. 11 illustrates a gas filtering device 510 in accordance with a further embodiment. Indeed, gas filtering device 510 of FIG. 11 is further configured to cover a surface, such as surface 112 (FIG. 5), from which gases are emanating, as described in the above embodiments. Gas filtering device 510 also comprises an air tight geomembrane 514 which is adapted to cover a surface such as surface 112. Gas filtering device 510 further comprises spaced apart air permeable filtering cartridge pockets 516 that are embedded within air tight geomembrane 514. Each one of the air permeable filtering cartridge pockets 516 is adapted to adopt a closed configuration and an opened configuration. Gas filtering device 510 further comprises filtering cartridges (not shown) that are releasably secured within each one of the spaced apart air permeable filtering cartridge pockets 516. Gas filtering device 510 further comprises access ports, such as access ports 580, that are embedded within air tight geomembrane 514. Still referring to FIG. 11, there is shown that gas filtering device 510 further comprises windows, such as windows 582, that are also embedded within air tight geomembrane 514. Thus, a person skilled in the art to which the gas filtering device pertains would understand that air tight geomembrane 514 may include one or more access port(s), such as access ports 580 and/or one or more window(s), such as windows 582. An access port may be of any shape, size, and/or configuration, as long as it provides one to access interior of basin/tank (either for one going in to lowering and/or removing equipment from basin). A window may be of any shape, size, and/or configuration, as long as it provides one to monitor and/or visually inspect the basin/tank and/or process occurring within the basin/tank without having to remove air tight geomembrane 514 itself.

Still referring to FIG. 11, there is shown that each one of the access ports 580 and the windows 582 is defined by a membrane, which defines a membrane surface (facing the basin/tank when installed), as well as an opening in geomembrane 514. The membrane defines peripheral edges, while the opening in geomembrane 514 also defines corresponding peripheral edges. Peripheral edges of the opening found in geomembrane 514 are configured to releasably engage with corresponding peripheral edges found on the membrane surface such as to provide access ports and/or windows to adopt an opened and a closed configuration (that are similar to the opened and closed configurations provided to the air permeable filtering cartridge pockets described in more details above). One or more of the peripheral edges may be fused to their corresponding peripheral edges, so that the membrane (of an access port or of a window) remains secured to geomembrane 514, even when access port 580 or window 582 is found in its opened configuration. It is however to be noted that a person skilled in the art to which the gas filtering device described above pertains would understand that access ports and windows may take any shape, size and/or configuration, as long as it provides one to access interior of basin/tank in the case of the access port or as long as it provides one to monitor and/or visually inspect the basin/tank and/or process occurring within the basin/tank without having to remove air tight geomembrane 514 itself in the case of the window. Therefore, one or more peripheral edges may be configured to releasably connect with its corresponding peripheral edge. The membrane may therefore be completely disconnected from geomembrane 514 (when an access port 580 or a window 582 is provided in its opened configuration), as long as it can be connected again to geomembrane 514.

As described above with regards to the air permeable filtering cartridge pockets, there is shown that a fastening member is found on peripheral edges of the membrane (access ports and windows), while a corresponding fastening member is found on corresponding peripheral edges of the opening to releasably connect with the fastening member found on peripheral edges of the membrane. Such fastening members may comprise hook and loop fasteners. A person skilled in the art to which the gas filtering device 510 described above pertains would however understand that any other suitable fastening devices may be used (magnetized elements, sticky elements, and the like), as long as it provides access ports 580 and windows 582 to adopt their opened and closed configurations.

High-strength, flexible, passive, chemically-resistant gas/odor filtering devices as described above allow to completely cover any surface, and further treat air flow going through the devices using the passive filtration of activated carbon filters. Such process results in financial savings by eliminating expensive ventilation systems, maintenance costs, and on-going replenishment of chemicals.

Gas filtering devices described above may be designed to fit any size, shape and/or configuration of surface or area to be covered while providing air filtration, such as to remove odors and greenhouses gases. Gas filtering devices provide a radical reduction of gas and odorous emissions coming for example, from a water surface. Gas filtering device do not require any input of energy or chemicals to operate, and the installation may be performed by unskilled labor. The maintenance required is further minimal, mainly to keep the surface clean and further to remove and replace filtering cartridges when required. Such replacing of the filtering cartridge may be performed via a single person/operator without any auxiliary support of machinery or tools.

The gas filter devices can be packaged in a small form factor and easily manipulated during transport and/or installation, thanks to the flexibility of the airtight geomembrane. As it is suspended above surface, it is not affected by aeration, level changes, foam, etc. It further eliminates odours and GHG emissions, and has no dangerous gas build-up. It is an engineered solution that minimizes modifications on sites. It also provides a simple filter replacement as well as an easy access to the basin.

While preferred embodiments have been described above and illustrated in the accompanying drawings, it will be evident to those skilled in the art that modifications may be made therein without departing from the essence of this disclosure. Such modifications are considered as possible variants comprised in the scope of the disclosure.

The invention claimed is:

1. A gas filtering device for covering a surface from which gases are emanating, the gas filtering device comprising:
    an air tight geomembrane adapted to cover and seal the surface
    a plurality of spaced apart air permeable filtering cartridge pockets embedded within the air tight geomembrane adapted to adopt an opened configuration and a closed configuration; and
    a plurality of filtering cartridges, each one of the filtering cartridges being releasably secured within a corresponding one of the plurality of spaced apart air permeable filtering cartridge pockets;
    wherein each one of the spaced apart air permeable filtering cartridge pockets comprises: an air permeable pocket first sheet defining a first sheet first surface and a first sheet second surface opposite the first sheet first surface; and an air permeable pocket second sheet defining a second sheet first surface and a second sheet second surface opposite the second sheet first surface, at least part of the second sheet first surface releasably engaging with at least part of the first sheet second surface to allow the air permeable filtering cartridge pocket to adopt the opened and closed configurations.

2. The gas filtering device of claim 1, wherein the air permeable pocket second sheet farther comprises a connecting member for providing the air permeable filtering cartridge pocket in its opened configuration.

3. The gas filtering device of claim 1, wherein: the air permeable pocket first sheet comprises a first set of apertures; and the air permeable pocket second sheet comprises a second set of apertures; the first and second set of apertures allowing gases that are emanating from the surface to be filtered while travelling towards and further away from the filtering cartridge releasably secured within the air permeable filtering cartridge pocket.

4. The gas filtering device a claim 1, wherein the air tight geomembrane comprises polyester.

5. The gas filtering device of claim 1, wherein the air permeable pocket first sheet comprises a reinforcement member.

6. The gas filtering device of claim 1, wherein the filtering cartridge is an activated carbon filter.

7. The gas filtering device of claim 1, wherein the filtering cartridge comprises at least one of: an activated carbon filter, a photo-catalytic membrane, an organic compound and a gas-and-odor filtering media.

8. The gas filtering device of claim 1, further comprising at least one of: an access port and a window embedded within the air tight geomembrane, each one of the access port and the window configured to adopt an opened configuration and a closed configuration.

9. The gas filtering device of claim 1, wherein the gases are emanating from an opened-air tank defining a tank peripheral edge and tank walls, the gas filtering device further comprising: a securing elongated member fixedly mounted on the tank peripheral edge, the securing elongated member together with the tank peripheral edge securing the air tight geomembrane therebetween.

10. The gas filtering device of claim 9, wherein: the securing elongated member defining spaced apart holes; the gas filtering device further comprising: spaced apart anchors positioned about the tank peripheral edge for receiving the second securing elongated member via its spaced apart holes.

11. The gas filtering device of claim 3, wherein the first sheet second surface defines a first peripheral edge:, and the second sheet first surface defines a second peripheral edge corresponding to the first peripheral edge, at least part of the second period peripheral edge releasably engaging with at least part of the first peripheral edge to allow the air permeable filtering cartridge pocket to adopt the opened and closed configurations.

12. The gas filtering device of claim 11, further comprising: a fastening member on at least part of the first peripheral edge; and a corresponding fastening member on at least part of the second peripheral edge to releasably connect with the fastening member.

13. The gas filtering device of claim 12, wherein the fastening member and the corresponding fastening member comprise hook and loop fasteners.

14. The gas filtering device of claim 11, wherein part of the second peripheral edge is fused with part of the first peripheral edge to allow the air permeable filtering cartridge pocket to adopt the opened and closed configurations.

15. The gas filtering device of claim 1, wherein the gases are emanating from an opened-air tank defining a tank peripheral edge and tank walls, the gas filtering device further comprising: a first securing elongated member fixedly mounted about the tank peripheral edge; and a second securing elongated member fixedly mounted on the first securing elongated member, the first and second securing elongated member together securing the air tight geomembrane therebetween.

16. The gas filtering device of claim 15, wherein: the first securing elongated member defining spaced apart holes; and the second securing elongated member defining corresponding spaced apart holes; the gas filtering device further comprising: spaced apart anchors positioned about the tank peripheral edge for receiving the first and second securing elongated members via their spaced apart holes and the corresponding spaced apart holes.

17. The gas filtering device of claim 16, further comprising a supporting device secured to the opened-air tank for supporting the air tight geomembrane.

18. The gas filtering device of claim 17, wherein the supporting device comprises: spaced apart elongated cable sections each defining a first cable section end and a second cable section end, the first cable section end being secured to one of the tank walls, the second cable section end being secured to another one of the tank walls opposite the one a the tank walls.

19. The gas filtering device of claim 17, wherein the supporting device comprises: a first set of spaced apart elongated cables; and a second set of spaced apart elongated cables positioned perpendicularly to the first set of spaced apart elongated cables, each elongated cable from the first and second sets of spaced apart elongated cables defining a first cable end and a second cable end, the first cable end being secured to one of the tank walls, the second cable end being secured to another one of the tank walls opposite the one of the tank walls.

20. The gas filtering device of claim 19, wherein each elongated cable from the first and second sets of spaced apart cables comprises a first cable anchor about the first cable end and a second cable anchor about the second cable end, the first cable anchor being secured to one of the tank walls, the second cable anchor being secured to another one of the tank walls opposite the one of the tank walls.

* * * * *